United States Patent
Gaultier et al.

[11] Patent Number: 6,034,672
[45] Date of Patent: Mar. 7, 2000

[54] DEVICE FOR MULTIMODE MANAGEMENT OF A CURSOR ON THE SCREEN OF A DISPLAY DEVICE

[75] Inventors: Philippe Gaultier, Le Chesnay; Patrick Vouillon, Villebon sur Yvette; Marie-Heléne Debrus, Boulogne Billancourt, all of France

[73] Assignee: Sextant Avionique, Meudon la Foret, France

[21] Appl. No.: 08/258,601

[22] Filed: Jun. 10, 1994

Related U.S. Application Data

[63] Continuation of application No. 08/005,136, Jan. 15, 1993, abandoned.

[30] Foreign Application Priority Data

Jan. 17, 1992 [FR] France .................................... 92 00524

[51] Int. Cl.$^7$ ........................................................ G06F 3/03
[52] U.S. Cl. ................................................ 345/173; 345/157
[58] Field of Search ........................ 178/18, 19; 341/22; 345/156, 157, 160, 163, 167, 173, 174, 176, 177

[56] References Cited

U.S. PATENT DOCUMENTS

| | | |
|---|---|---|
| 4,543,562 | 9/1985 | Ny ............................................. 341/22 |
| 4,575,581 | 3/1986 | Langberg . |
| 4,736,191 | 4/1988 | Matzke et al. .......................... 340/709 |
| 4,804,949 | 2/1989 | Faulkerson . |
| 4,954,817 | 9/1990 | Levine ..................................... 340/709 |

FOREIGN PATENT DOCUMENTS 3036947  5/1982  Germany .

*Primary Examiner*—Jeffrey Brier
*Attorney, Agent, or Firm*—Browdy and Neimark

[57] ABSTRACT

The management device embodying the invention uses a control source consisting in a touch-sensitive work board comprising a touch-sensitive surface and a means enabling detection of a force on said surface. It further comprises a selection means enabling switching from the relative pointing mode to the absolute pointing mode depending on whether the force exerted exceeds or is less than a predetermined threshold value. The invention enables the advantages of the two pointing modes to be accumulated.

4 Claims, 2 Drawing Sheets

DEVICE FOR MULTIMODE MANAGEMENT OF A CURSOR ON THE SCREEN OF A DISPLAY DEVICE

This application is a continuation of application Ser. No. 08/005,136, filed Jan. 15, 1993, now abandoned.

BACKGROUND OF THE INVENTION

1—Field of the Invention

This invention relates to a device for multimode management of a cursor on the screen of a display device associated with a processor.

2—Description of the Prior Art

In a general manner, it is known that for pointing on a screen, two principal pointing modes are currently proposed, i.e. the so-called "relative" pointing mode and the so-called "absolute" pointing mode.

The relative pointing mode, which is operated by mouse or track ball type manipulators, consists in sending to the processor managing the screen, the coordinates of a cursor or pointer, expressed in a Cartesian coordinate system having as origin the position of this cursor or pointer. The displacement of this cursor on the screen is then controlled by a homothetic displacement of the manipulator (e.g. displacement of the mouse on its supporting surface).

This pointing mode has notably the following advantages:

- the manipulator can moved blindly, the operator need only watch the screen without any concern as regards the position of the manipulator;
- it enables great accuracy to be obtained, as the operator can follow the path of the cursor (possibly in a large-scale screen area) up to the required point.

Conversely, this solution has the drawback of being relatively slow (the time required for the operator to bring the cursor from one place to another may be deemed too long for certain applications).

As for the absolute pointing mode, it uses, at control source level, a sensitive surface (e.g. a touch-sensitive surface) of finite dimensions and of shape having isomorphic (or even homothetic) correspondence with a display zone which may consist in all or part of the screen.

According to this pointing mode, in order to position the cursor at a given point of the screen, the place corresponding to said point need only be indicated on the touch-sensitive surface.

It so happens that this pointing mode, which does not truly enable the operator to work blindly, is faster but does not enable a good degree of accuracy to be achieved easily: more or less lengthy trial and error is frequently required to obtain a precise point. It is for this reason that this mode is most often used for selecting given zones of the screen assigned e.g. to values or functions.

The two above-mentioned pointing modes can therefore be seen to be complementary in that the advantages of one suppress the drawbacks of the other, and vice versa.

OBJECT OF THE INVENTION

The main object of this invention is to turn this observation to good account, particularly to provide, with a view to combining the advantages of the two above-mentioned solutions, a cursor management device capable of operating in one or other of the aforesaid modes, and of passing from one of these modes to the other, subsequent to a control action that is perfectly integrated into the overall ergonomics of the system.

SUMMARY OF THE INVENTION

Accordingly, with a view to achieving these results, this management device uses a control source consisting in a touch-sensitive work board of the type comprising a touch-sensitive surface and a means enabling detection of a force exerted on said surface.

According to the invention, this device is characterized in that it comprises a selection means enabling switching of one of the two pointing modes to the other depending on whether the force exerted exceeds or is less than a predetermined threshold value.

Advantageously, in the absence of force exerted on the touch-sensitive surface, or when this pressure remains below said threshold, the selection means selects the relative pointing mode, whereas when the force rises above said threshold, the selection means selects the absolute pointing mode.

By virtue of this arrangement, the operator can notably quickly place the cursor in a zone of the screen by exerting a pressure on the touch-sensitive work board (absolute pointing mode) and then move this cursor with the accuracy provided by the relative mode, by displacing his/her finger while releasing the pressure.

The operator could also, of course, remain in the absolute mode by displacing his/her finger while maintaining pressure exceeding said threshold on the touch-sensitive surface.

This combination of the two pointing modes, theoretically not very compatible, therefore proves to be particularly advantageous.

BRIEF DESCRIPTION OF THE DRAWINGS

Other features and advantages of the invention will be clear from the execution mode described hereafter, by way of a non limiting example, with reference to the accompany g drawings in which.

DESCRIPTION OF THE PREFERRED EMBODIMENTS

Figure 1:
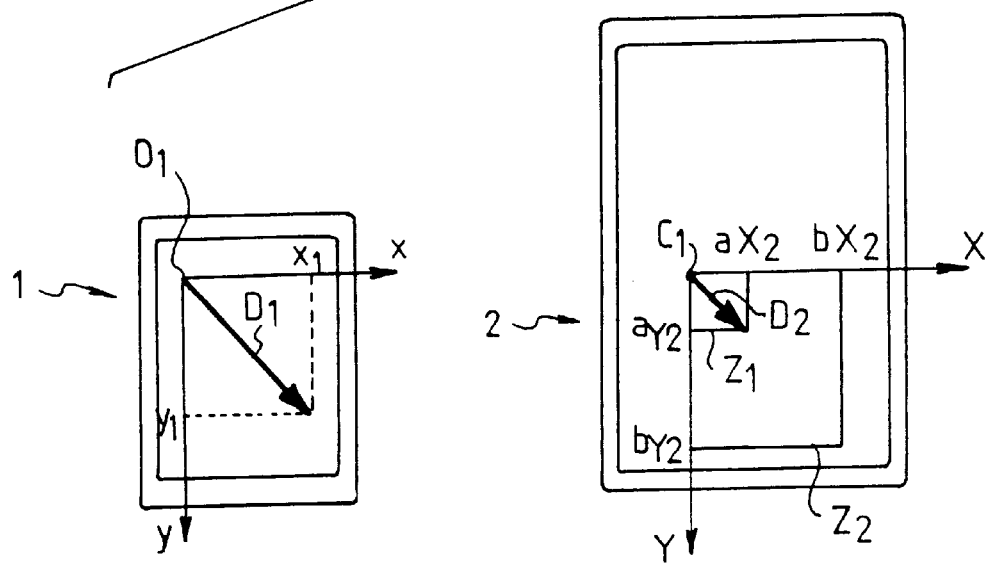
FIG. 1 is a schematic representation of a touch-sensitive surface and a screen, enabling the principle of the absolute type pointing mode to be illustrated.
Figure 2:
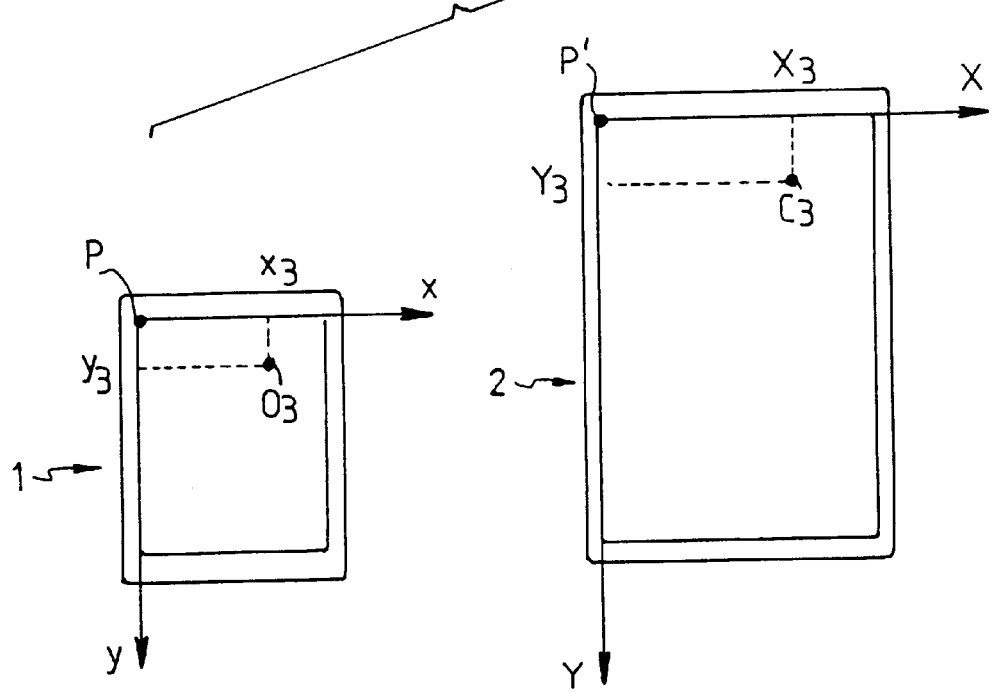
FIG. 2 is a view similar to that of FIG. 1 but enabling the principle of a relative type pointing mode to be illustrated.

In the examples illustrated in FIGS. 1 and 2, the touch-sensitive surface 1 and the screen 2 have been schematically represented by two respective rectangles, that of the screen having larger dimensions than that of the touch-sensitive surface.

The touch-sensitive surface 1 can be of a conventional type, e.g. of capacitive, resistive, optical, piezoelectric type, etc.

Figure 3:
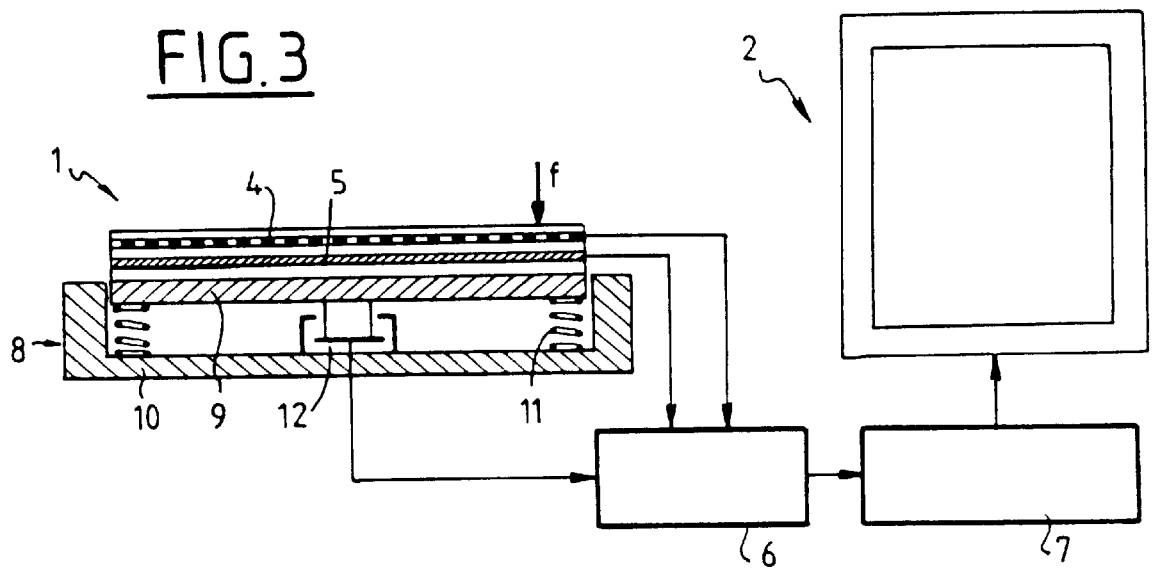
FIG. 3 is a schematic representation of a touch-sensitive work board that can be used in the device embodying the invention.

In the example represented in FIG. 3, it uses two layers of superimposed electrodes forming a multiplicity of elementary capacitors each forming a detection point.

These electrodes are connected to one another by two series of conductive links arranged in a matrix configuration, the links connecting the electrodes of one of the layers constituting the lines 4, the links associated with the other layer forming the columns 5, and the elementary capacitors being situated at the intersections between the lines 4 and the columns 5.

The lines 4 and columns 5 are connected to an electronic detecting circuit 6 which is coupled to a computer 7 ensuring management of the screen 2.

The electronic circuit 6 is designed so as to cyclically apply an electric signal to the lines 4 and columns 5, and to detect, for each line/column pair, a possible variation of this electric signal, caused by the presence of an electrically conductive object near the elementary capacitor formed by the intersection of this line 4 and this column 5.

The detection of such a signal variation does, of course, enable the object (of operator's finger) to be located in a Cartesian coordinate system linked with the touch-sensitive surface.

In the relative pointing mode (FIG. 1), the computer 7 determines each of the displacements of the object on the touch-sensitive surface in a coordinate system of axes $O_1x$, $O_1y$ having as origin $O_1$ the starting point of the displacement (arrow $D_1$).

The computer 7 is further designed so as to determine a corresponding displacement $D_2$ of the cursor $C_1$ displayed on the screen 2, in a coordinate system of axes $C_1X$, $C_1Y$ having as origin the initial position of the cursor $C_1$, this displacement $D_2$ being deduced, by homothety, from the displacement $D_1$ of the object.

An important advantage of this pointing mode consists in its enabling different levels of accuracy to be obtained, as the zone of the screen 2 managed by the entire touch-sensitive surface 1 can either be more or less confined, or cover the whole screen.

This particularity is illustrated in FIG. 1 in which two zones $Z_1$ ($aX_2$, $aY_2$)–$Z_2$ ($bX_2$, $bY_2$), which have been indicated in broken lines, can be managed by the entire touch-sensitive surface 1.

In the absolute pointing mode (FIG. 2), the computer 7 expresses the coordinates $x_3$, $y_3$ of the object $O_3$ in a coordinate system of axes Px, Py having as origin a set point P of the touch-sensitive surface (e.g. the upper left-hand corner of this touch-sensitive surface). From these coordinates $x_3$, $y_3$, it deduces the coordinates $X_3$, $Y_3$ of the position of the cursor in a coordinate system of axes P'X, P'Y itself having as origin a set point P' of the screen 2 (e.g. the upper left-hand corner of the screen).

According to this pointing mode, in order to move the cursor $C_3$ towards a point on the screen, the object $O_3$ (e.g. finger) need only be placed on the point of the touch-sensitive surface having isomorphic correspondence with the image of the point of the screen 2.

As previously stated, with a view to combining the advantages of the two previously described pointing modes, the invention proposes to use, as control source, a touch-sensitive work board 8 comprising, as represented in FIG. 3, a mobile supporting structure 9 having a flat rigid surface, mounted on a set structure 10 through the intermediary of an effort measurement system using, between these two structures, springs 11 and a displacement sensor 12.

The flat surface of the mobile structure is covered with the touch-sensitive surface 1 previously described.

The effort measurement system serves, in this instance, to select the pointing mode used by the touch-sensitive work board: in this way, in the case of the pressure exerted on the touch-sensitive work board 8 being nil or below a predetermined threshold value F, the computer 7 transmits the coordinates in the relative mode (relative pointing mode).

Conversely, when the operator exerts, on the touch-sensitive work board 8, a pressure f exceeding the threshold value, the sensor 12 transmits a signal causing the relative pointing mode to switch to the absolute pointing mode and therefore computes the coordinates in the absolute mode.

Figure 4:
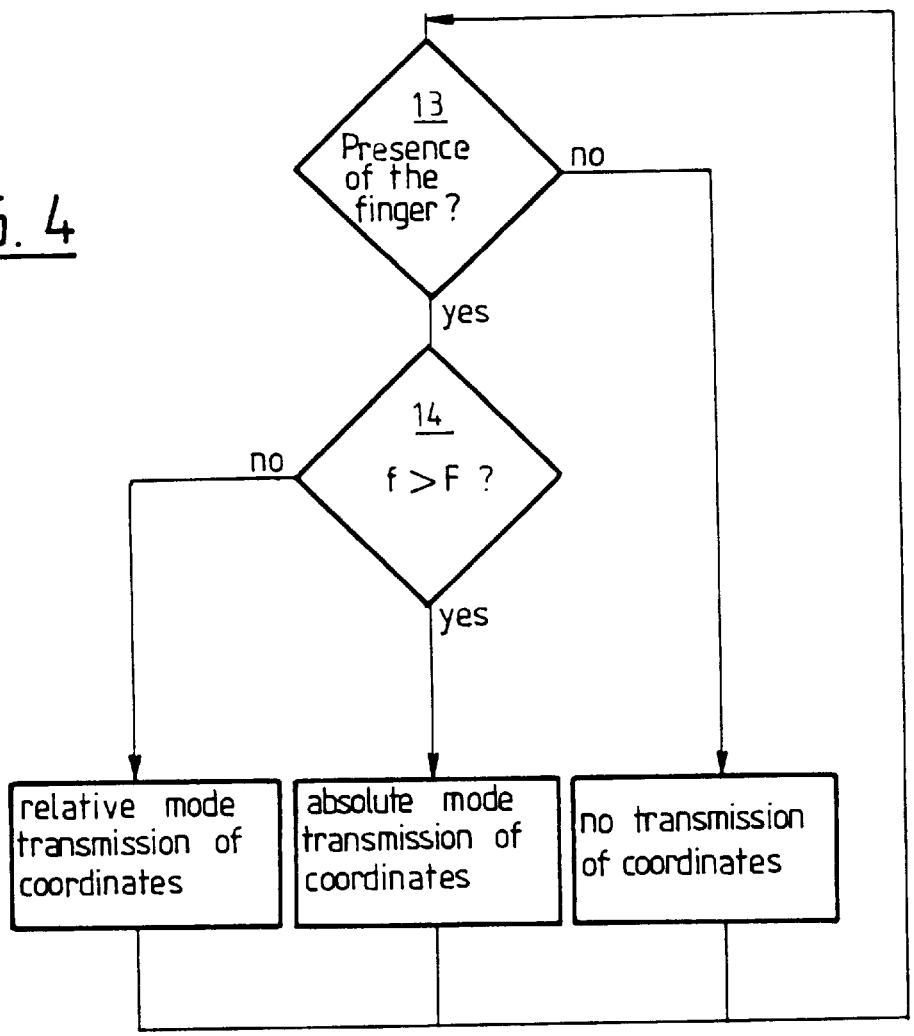
FIG. 4 is a pointing mode selection algorithm embodied by the touch-sensitive work board.

This selection process is illustrated in the algorithm in FIG. 4 in which:

the conditional branch 13 marks the phase of detection of the presence or absence of an object, e.g. the operator's finger, on the touch-sensitive work board 8:
in the event of an absence, the computer 7 interrupts the transmission of coordinates,
in the event of a presence, the computer 7 selects a pointing mode via a conditional branch 14, the conditional branch 14 which compares the force f applied to the touch-sensitive work board 8 with a threshold value F, and
when the force f is below the value F, causes the computer to switch to the relative pointing mode, and
when the force f exceeds the threshold F, causes the computer to switch to the absolute pointing mode.

In addition, the previously described management device can, of course, use a validating means notably enabling validation of the information indicated by the pointer in the relative pointing mode. This validating means can, if required, be provided on the touch-sensitive work board 8.

We claim:

1. Method for positioning without discontinuity a cursor on a desired location of a screen of a display device, using a control source consisting in a touch-sensitive work board comprising a touch-sensitive surface producing electrical signals indicating X-Y position coordinates of an operator's finger in contact therewith and a force exerted by said finger thereon, said signals being transmitted to a processor comprising means for positioning the cursor on the display screen according to an absolute pointing mode wherein each point of the touch-sensitive surface corresponds isomorphically to a point of the display screen, and to a relative pointing mode wherein a displacement of the cursor on the display screen is controlled by a homothetic movement of the finger close to said surface, and switching means for selecting said absolute pointing mode if said force rises above a predetermined threshold, and said relative mode if said force remains below said threshold, said method comprising successively:

a first step during which the finger is applied with a force exceeding said threshold on a first location of the touch-sensitive surface so as to coarsely position the cursor on a first location on the display screen near said desired location, a second step during which the force exerted by said finger on said touch-sensitive surface is reduced to a value below said threshold so as to select the relative pointing mode, said finger staying on said first location of the touch-sensitive surface while the cursor stays on said first location on the display screen, and a third step during which said finger exerts on said surface a force which remains below said threshold and is moved so as to accurately move the cursor from said first location on the display screen to said desired location.

2. A device for multimode management of a cursor on a screen of a display device associated with a processor, said device using a control source consisting in a touch-sensitive work board comprising a touch-sensitive surface producing electrical signals indicating X-Y position coordinates of an object in contact therewith and a force exerted by said object thereon, and means for transmitting said signals to the processor, the processor comprising in combination:

first means for positioning the cursor on the display screen according to an absolute pointing mode wherein each point of the touch-sensitive surface corresponds isomorphically to a point of the display screen, second means for positioning the cursor on the display screen according to a relative pointing mode wherein a displacement of the cursor on the screen is controlled by a homothetic movement of the object close to said surface, means for comparing said force with a predetermined threshold, means for selecting said first cursor positioning means if said force rises above said predetermined threshold, means for selecting said second cursor positioning means if this force remains below said threshold, and means for activating the selected cursor positioning means.

3. The device as claimed in claim 2, further comprising a validation means incorporated or not into said touch sensitive surface.

4. The device as claimed in claim 2, further comprising a means enabling the processor to interrupt the transmission of the coordinates signals coming from said touch-sensitive work board if no object is detected on said touch-sensitive surface.

* * * * *